United States Patent
Albero et al.

(10) Patent No.: US 12,118,120 B2
(45) Date of Patent: Oct. 15, 2024

(54) PREVENTION OF UNAUTHORIZED ACCESS TO INFORMATION

(71) Applicant: Bank of America Corporation, Charlotte, NC (US)

(72) Inventors: George Anthony Albero, Charlotte, NC (US); Madhavi Mendu, Edison, NJ (US)

(73) Assignee: Bank of America Corporation, Charlotte, NC (US)

( * ) Notice: Subject to any disclaimer, the term of this patent is extended or adjusted under 35 U.S.C. 154(b) by 822 days.

(21) Appl. No.: 17/321,899

(22) Filed: May 17, 2021

(65) Prior Publication Data

US 2022/0366075 A1  Nov. 17, 2022

(51) Int. Cl.
| | |
|---|---|
| *G06F 21/31* | (2013.01) |
| *G06F 21/32* | (2013.01) |
| *G06F 21/36* | (2013.01) |
| *G06F 21/54* | (2013.01) |
| *G06F 21/62* | (2013.01) |

(52) U.S. Cl.
CPC .......... *G06F 21/6245* (2013.01); *G06F 21/32* (2013.01); *G06F 21/36* (2013.01); *G06F 21/54* (2013.01)

(58) Field of Classification Search
CPC ...... G06F 21/6245; G06F 21/32; G06F 21/36; G06F 21/54; G06F 21/31
See application file for complete search history.

(56) References Cited

U.S. PATENT DOCUMENTS

| | | | |
|---|---|---|---|
| 5,324,924 A | 6/1994 | Cai et al. | |
| 5,761,686 A | 6/1998 | Bloomberg | |
| 6,641,050 B2 | 11/2003 | Kelley et al. | |
| 7,043,754 B2 | 5/2006 | Arnouse | |

(Continued)

FOREIGN PATENT DOCUMENTS

| | | |
|---|---|---|
| CN | 101051341 A | 10/2007 |
| CN | 101256652 A | 9/2008 |

(Continued)

OTHER PUBLICATIONS

Albero, G. A. et al., "Information Security by Preventing Unauthorized Data Access," U.S. Appl. No. 17/322,021, filed May 17, 2021, 37 pages.

*Primary Examiner* — Joseph P Hirl
*Assistant Examiner* — Aayush Aryal

(57) ABSTRACT

A system is provided for encoding user information. The system is configured to generate a random code pattern, assign the random code pattern to a user, assign a personal identifier of the user to the random code pattern, map a combination of the random code pattern and the personal identifier to user information associated with the user, and store an association of the random code pattern and the personal identifier to the user information in a mapping table. The system is further configured to receive from a decoder a query comprising the random code pattern and the personal identifier of the user, wherein the decoder is configured to decode the random code pattern. The system determines based on the mapping table, the user information mapped to the combination of the random code pattern and the personal identifier and transmits the user information to the decoder.

19 Claims, 4 Drawing Sheets

(56) References Cited

U.S. PATENT DOCUMENTS

| | | |
|---|---|---|
| 7,410,099 B2 | 8/2008 | Fukasawa et al. |
| 8,235,287 B2 | 8/2012 | Mckelvey |
| 8,413,884 B2 | 4/2013 | Lim et al. |
| 9,058,533 B2 | 6/2015 | Fedorovskaya et al. |
| 9,147,092 B2 | 9/2015 | Jeng et al. |
| 9,390,357 B2 | 7/2016 | Friedman et al. |
| 9,741,085 B2 | 8/2017 | Avni et al. |
| 9,769,354 B2 | 9/2017 | Thrasher et al. |
| 9,892,245 B2 | 2/2018 | Krishnamurthi |
| 10,102,465 B2 | 10/2018 | Annamalai et al. |
| 10,318,851 B2 | 6/2019 | Feng |
| 10,402,815 B2 | 9/2019 | Sharma et al. |
| 10,437,970 B2 | 10/2019 | Holz et al. |
| 10,552,848 B2 | 2/2020 | Soborski |
| 10,824,714 B2 | 11/2020 | Beatson et al. |
| 10,896,409 B2 | 1/2021 | Kang |
| 10,943,225 B2 | 3/2021 | Flurscheim et al. |
| 2006/0065733 A1 | 3/2006 | Lee et al. |
| 2007/0136202 A1* | 6/2007 | Noma ................ G06F 21/6245 705/51 |
| 2008/0200153 A1 | 8/2008 | Fitzpatrick et al. |
| 2008/0217400 A1 | 9/2008 | Portano |
| 2010/0043076 A1 | 2/2010 | Wesby |
| 2010/0110196 A1 | 5/2010 | Wesby |
| 2010/0250364 A1 | 9/2010 | Song et al. |
| 2019/0050641 A1 | 2/2019 | Cervin et al. |
| 2019/0180272 A1* | 6/2019 | Douglas ............. H04L 67/1097 |
| 2022/0147648 A1* | 5/2022 | Babcock ............. G06F 21/6245 |

FOREIGN PATENT DOCUMENTS

| | | |
|---|---|---|
| CN | 101393634 A | 3/2009 |
| CN | 101437038 A | 5/2009 |
| CN | 103004205 B | 2/2017 |
| CN | 103765885 B | 4/2017 |
| DE | 60225329 T2 | 2/2009 |
| EP | 1612724 B1 | 9/2009 |
| EP | 3094092 B1 | 6/2018 |
| JP | 2019030023 A | 2/2019 |
| JP | 2021504860 A | 2/2021 |
| TW | 200504553 A | 2/2005 |

* cited by examiner

PREVENTION OF UNAUTHORIZED ACCESS TO INFORMATION

TECHNICAL FIELD

The present disclosure relates generally to information security, and more specifically to prevention of unauthorized access to information.

BACKGROUND

Protecting personal information has become a challenge today. Stolen personal information may be used to commit several types of fraud including opening fraudulent accounts, filing phony health insurance claims, making unauthorized purchases, selling personal information on the dark web and the like. Personal information of users is readily displayed in many user devices. For example, identity cards, driving licenses, credit cards and debit cards display a user's personal information imprinted on them such as name, age, license number, credit card/debit card number, expiration date and other personal user information. This makes it easy for perpetrators to steal user information from these devices. Even when personal information is encoded (e.g., Quick Response (QR) code, bar code, digital encoding etc.) such that only authorized decoders can decode the information, perpetrators have devised ingenious methods to extract such encoded information.

SUMMARY

The system and methods implemented by the system as disclosed in the present disclosure provide technical solutions to the technical problems discussed above by encoding user information such that only authorized decoders can access the encoded user information. The disclosed system and methods provide several practical applications and technical advantages. For example, the disclosed system provides the practical application of protecting user information from theft by encoding the user information in a manner that does not allow extraction of the user information by reading the encoded information alone. As disclosed in the following disclosure, an encoder encodes user information by generating and assigning a random code pattern to the user information associated with each user. Each random code pattern is completely random such that the random code pattern itself does not include any meaningful information. As the code pattern does not include any user information, having access to the code pattern alone is of no use to a perpetrator. This allows the code patterns to be imprinted and displayed on user devices such as identity cards, credit cards and debit cards for ease of reading by an authorized decoder without the fear of data theft.

The disclosed system provides an additional practical application of providing a highly secure method for decoding encoded user information. For example, as disclosed in the following disclosure, a personal identifier is assigned to a user which acts as a key to decoding a random code pattern that encodes the user information. An authorized decoder must obtain the personal identifier from the user and query a mapping table based on a combination of the random code pattern and the personal identifier of the user in order to access the user information. The personal identifier adds another layer of security to the randomness of the code pattern. Thus, disclosed system and methods implemented by system as discussed herein provide a high degree of information security.

In one or more embodiments, an encoder generates a random, assigns the random code pattern to a user and assigns a personal identifier of the user to the random code pattern. The encoder maps a combination of the random code pattern and the personal identifier to user information associated with the user and stores an association of the random code pattern and the personal identifier to the user information in a mapping table. In some cases, the encoder may receive from a decoder a query comprising the random code pattern and the personal identifier of the user, wherein the decoder is configured to decode the random code pattern. The encoder determines based on the mapping table, the user information mapped to the combination of the random code pattern and the personal identifier and transmits the user information to the decoder.

In one or more embodiments, a decoder obtains a random code pattern from at least one of a card or a device owned by a user. The decoder further obtains a personal identifier from the user. The decoder then queries a mapping table based on a combination of the random code pattern and the personal identifier of the user, wherein the mapping table comprises user information associated with each of a plurality of users mapped to a respective unique combination of a random code pattern and a personal identifier of the user. The decoder obtains user information of the user in response to the query, wherein one or more actions are performed based on the user information.

Certain aspects of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
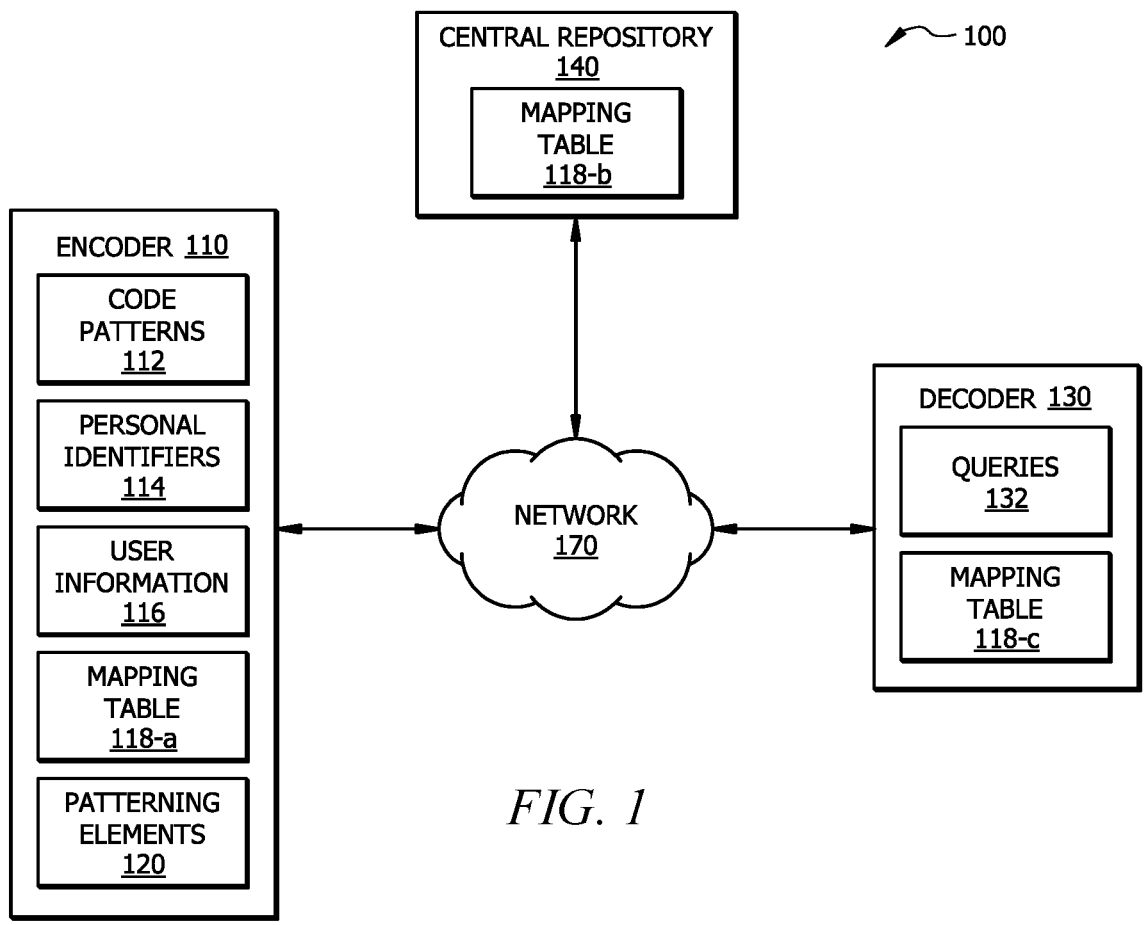
FIG. 1 is a schematic diagram of an example system for securing user information, in accordance with certain embodiments of the present disclosure.

FIG. 1 is a schematic diagram of an example system 100 for securing user information, in accordance with certain embodiments of the present disclosure.

As shown in FIG. 1, system 100 may include an encoder 110, a decoder 130 and a central repository 140 each connected to a network 170. The network 170, in general, may be a wide area network (WAN), a personal area network (PAN), a cellular network, or any other technology that allows devices to communicate electronically with other devices. In one or more embodiments, the network 170 may be the Internet.

In one or more embodiments, each of the encoder 110, decoder 130 and central repository 140 may be implemented by a computing device running one or more software applications. For example, one or more of the encoder 110, decoder 130 and central repository 140 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the encoder 110, decoder 130 and central repository 140 may be representative of a server running one or more software applications to implement respective functionality as described below. In certain embodiments, one or more of the encoder 110, decoder 130 and central repository 140 may run a thin client software application where the processing is directed by the thin client but largely performed by a central entity such as a server (not shown).

It may be noted that the term "device" used throughout this disclosure may refer to electronic devices such as electronic wearable devices (e.g. smart watch), smart phones, electronic toll tag devices etc., as well as non-electronic devices such as identity cards, driving licenses, credit cards, debit cards and the like.

Encoder

Encoder 110 may be configured to encode user information 116 so that only an authorized decoder 130 can access the user information 116. User information 116 may include any information associated with a user including personal information of the user such as, but not limited to, name, age, sex, residential address, social security number, nationality, state identity number, driving license number, and credit card or debit card details such as credit/debit card numbers, expiration dates, security codes and the like.

Encoder 110 may be configured to generate random code patterns 112. Each random code pattern 112 generated by encoder 110 is completely random such that the random code pattern 112 itself does not include any information. A random code pattern 112 generated by encoder 110 may include, but is not limited to, one or more of numbers, letters, alphanumeric characters, a Quick Response (QR) code pattern, a bar code pattern, pictures, shapes, images, special characters and combinations thereof. Encoder 110 is provided with patterning elements 120 including, but not limited to, one or more of numbers, letters, words, shapes, images, pictures, special characters, bar code patterns, QR code patterns and combinations thereof. To generate a random code pattern 112, encoder 110 randomly combines two or more patterning elements 120. Since, each random code pattern 112 is built by randomly combining patterning elements 120, the random code pattern 112 does not include any meaningful information such as user information 116.

In order to encode user information 116 associated with a user, encoder 110 may be configured to assign a random code pattern 112 to the user and then assign a personal identifier 114 of the user to the random code pattern 112. The encoder 110 is configured to map a combination of the random code pattern 112 (assigned to the user) and the personal identifier 114 of the user (assigned to the random code pattern) to the user information 116 associated with the user. Thus, a unique combination of the random code pattern 112 and personal identifier 114 of the user identifies the user information 116 associated with the user. A personal identifier 114 of the user can include, but is not limited to, one or more of numbers, alphabets, alphanumeric characters, special characters and combinations thereof. For example, a personal identifier 114 of a user may be a personal identifier number (PIN) including a string of numbers. In some embodiments, a personal identifier 114 may include biometrics data of the user including, but not limited to, fingerprints, retina scans, facial recognition or combinations thereof. A personal identifier 114 can be assigned to the user or can be selected by the user. In one embodiment, a personal identifier 114 of a user may be associated with a device owned by the user. For example, a personal identifier 114 can be associated with a non-electronic device such as an identity card, a driving license or an electronic device such as an electronic wearable device owned by the user.

If the user owns multiple devices (e.g., multiple ID cards, driving license, credit cards, debit cards, smart watch etc.), encoder 110 may assign a different unique personal identifier 114 (e.g., PIN) to each device owned by the user. In such a case, each of the multiple personal identifiers 114 assigned to the user may be mapped to the same random code pattern 112 generated by encoder 110. In this case, the single random code pattern 112 (common to all the personal identifiers 114 and corresponding devices owned by the user) may represent the total user information 116 associated with the user, and each personal identifier 114 assigned to the single code pattern 112 represents a portion of the user information 116 relevant to the device to which the personal identifier 114 is assigned. For example, the total user information 116 associated with the user may include, user name, age, sex, residential address, height, ID number, driving license number, credit card number and corresponding expiration date and security code, debit card number and corresponding expiration date and debit card PIN, and the like. However, a PIN assigned to the user's driving license is only associated with the user's name, age, sex, residential address, height, and driving license number and no other user information 116. On the other hand, a PIN assigned to the user's credit card is associated with the user's name, credit card number, expiration date and security code and no other user information 116.

In an alternative embodiment, each device owned by the user may be assigned a different random code pattern 112, wherein each of the different random code patterns 112 assigned to the user (e.g., a user's device) is associated with a portion of the user information 116 relevant to the respective user device. In this case, the same personal identifier 114, or a different unique personal identifier 114, may be assigned to each user device and the unique random code pattern 112 of the device.

Encoder 110 may be configured to store an association of each random code pattern 112 and a corresponding personal identifier 114 to the user information 116 (or a portion thereof) in a mapping table 118-*a*. Each combination of a random code pattern 112 and personal identifier 114 stored in the mapping table 118-*a* is unique and is associated with corresponding user information 116 of a user. Mapping table 118-*a* may include a record for each device owned by the user, wherein a record of the mapping table 118-*a* represents an association of a unique combination of a random code pattern 112 and a personal identifier 114 to user information 116 (or a portion thereof). For example, the mapping table 118-*a* may include one record each for a driver license, a credit card, a debit card and a smart watch of a user, wherein each record includes a unique combination of a random code pattern 112 and a personal identifier 114 (e.g., PIN) mapped to user information 116 or a portion thereof relevant to the particular device of the user. As discussed above, a user may be assigned a single random code pattern 112 that is common across multiple user devices and may be further assigned a personal identifier 114 (e.g., PIN) that is unique to each user device. In this case, each user device record in the mapping table 118-*a* includes a combination of the same code pattern 112 and the unique device PIN mapped to the relevant user information 116 for the device. Alternatively, several user devices may be assigned different unique code patterns 112 and may be further assigned the same or different personal identifiers (e.g., PINs). In this case, each user device record in the mapping table 118-*a* includes a combination of the unique code pattern 112 and the device PIN mapped to the relevant user information 116 for the device.

In one or more embodiments, encoder 110 may be configured to print code patterns 112 on device surfaces such as surfaces of an ID card, driver's license, credit card, debit card, wearable device, smart phone or the like. A code printing device may be part of the encoder 110 or may be communicably connected to the encoder 110. For example, encoder 110 may use a laser printer to laser etch code patterns 112 on surfaces of respective assigned devices. The printed code patterns may be read off the surfaces of the respective devices by decoder 130. The decoder 130 may decode the read code pattern 112 as described below to access user information 116 associated with the code pattern 112.

In additional or alternative embodiments, encoder 110 may transmit code patterns to electronic devices owned by a user using an electronic communication interface provided at the encoder 110. The communication interface may transmit a code pattern 112 to an electronic device over a wired connection or a wireless connection. Each electronic device may receive a respective code pattern 112 from the encoder and store the code pattern 112 in a local memory of the electronic device. A decoder 130 may read the code pattern 112 from the electronic device by receiving an electrical signal including the code pattern 122 from the electronic device. For example, a smart watch of a user may receive a respective code pattern 112 from the encoder 110 and store the code pattern 112 in a memory of the smart watch. The smart watch may transmit the code pattern 112 to a decoder 130 which can attempt to decode the code pattern 112 in order to access user information 116.

Encoder 110 may be configured to search the mapping table 118-*a* for user information based on a unique combination of a random code pattern 112 and personal identifier (e.g., PIN). For example, encoder 110 may be configured to receive a query 132 from a decoder 130 (e.g., over network 170), wherein the query 132 includes a random code pattern 112 and a personal identifier 114. As described above, mapping table 118-*a* stores user information 116 mapped to each unique combination of a random code pattern 112 and a personal identifier 114. Encoder 110 may be configured to extract the random code pattern 112 and the personal identifier 114 from the received query 132. Encoder 110 may then search the mapping table 118-*a* for user information 116 mapped to the combination of the random code pattern 112 and the personal identifier 114 received in the query. Encoder 110 may be configured to transmit the user information 116 found as a result of searching the mapping table 118-*a*, back to the decoder 130 (e.g., over network 170) in response to receiving the query 132.

In one or more embodiments, encoder 110 may transmit a copy of the mapping table 118-*a* to the central repository 140 and/or to one or more decoders 130 authorized to decode code patterns 112 generated by encoder 110. For example, as shown in FIG. 1, a copy of the mapping table 118-*a* is received from the encoder and stored as mapping table 118-*b* at the central repository 140. Additionally or alternatively, a copy of the mapping table 118-*a* is received and stored at the decoder 130 as mapping table 118-*b*.

As noted above, each random code pattern 112 is completely random such that the random code pattern 112 itself does not include any information. Thus, a perpetrator cannot extract any meaningful information merely by reading the random code pattern 112. A random code pattern 112 is useless without a corresponding personal identifier 114 which acts as a key to decoding the random code pattern 112. In some cases, the personal identifier 114 adds another layer of security to the randomness of the code patterns 112. Thus, system 100 and method implemented by system 100 as discussed herein provide a high degree of information security.

Decoder

Decoder 130 may be configured to decode random code patterns 112 read and/or received by decoder 130. A decoder 130 may be capable of and configured to read and/or receive a random code pattern 112 from a device. In some cases, decoder 130 may be capable of reading a code pattern 112 printed on a surface of a device (e.g., ID card, credit card, smart watch etc.) using one or more methods including, but not limited to, one or more of a camera, an infrared scanner, a barcode scanner, a Quick Response (QR) code scanner and a combination thereof. Additionally or alternatively, decoder 130 may receive code patterns 112 locally stored by electronic devices using an electronic communication interface provided at the decoder 130. The communication interface of the decoder 130 may receive a code pattern 112 transmitted by an electronic device using a wired or wireless connection with the electronic device.

As described above, a code pattern 112 does not include any useful information and a corresponding personal identifier 114 is needed to access user information 116 associated with the code pattern 112. Decoder 130 may be configured to obtain a personal identifier 114 assigned to the user (or to the user's device). Decoder 130 may obtain a personal identifier by several methods. In one embodiment, decoder 130 may be provided with a keypad which can be used by a user to type a personal identifier 114 (e.g., PIN). Additionally or alternatively, decoder 130 may electronically receive the personal identifier 114 transmitted from an electronic device using the communication interface of the decoder 130. In some cases, decoder 130 may read the personal identifier written or printed on a surface using a camera.

Once the decoder 130 obtains a random code pattern 112 and a personal identifier 114, decoder 130 may be configured to generate a query 132 that includes the obtained random code pattern 112 and the personal identifier 114. Decoder 130 may be configured to query a mapping table (e.g., one of the mapping tables 118-*a*, 118-*b* or 118-*c*) based on the generated query 132. For example, decoder 130 may transmit the query 132 to the encoder 110, for example, over the network 170. Upon receiving the query 132 from decoder 130, encoder 110 may be configured to search the mapping table 118-*a* for user information based on a unique combination of the random code pattern 112 and personal identifier 114 included in the query 132. For example, encoder 110 may search the mapping table 118-a for user information 116 mapped to the combination of the random code pattern 112 and the personal identifier 114 received in the query 132. Encoder 110 may be configured to transmit the user information 116 found as a result of searching the mapping table 118-a, back to the decoder 130 (e.g., over network 170) in response to receiving the query 132.

Additionally or alternatively, decoder 130 may transmit the query 132 to the central repository 140, for example, over the network 170. Upon receiving the query 132 from decoder 130, central repository 140 may be configured to search the mapping table 118-b for user information based on a unique combination of the random code pattern 112 and personal identifier included in the query 132. For example, central repository 140 may search the mapping table 118-b for user information 116 mapped to the combination of the random code pattern 112 and the personal identifier 114 received in the query 132. Central repository 140 may be configured to transmit the user information 116 found as a result of searching the mapping table 118-b, back to the decoder 130 (e.g., over network 170) in response to receiving the query 132.

Additionally or alternatively, decoder 130 may be configured to search mapping table 118-c locally stored at the decoder 130, based on the generated query 132. For example, decoder 130 may search the mapping table 118-c for user information 116 mapped to the combination of the random code pattern 112 and the personal identifier 114 included in the query 132. Decoder 130 may obtain user information 116 based on searching the mapping table 118-c.

Decoder 130 may be configured to perform one or more actions based on the obtained user information depending on the use case. In one example use case, a random code pattern 112 may be generated and printed by the encoder 110 on an ID card of a user. The user may need to present the ID card at a liquor store in order to verify that the user is over the legal age to buy alcoholic beverages. An authorized decoder 130 provided at the liquor store may read the code pattern 112 off the surface of the ID card. The user may additionally provide a PIN as the personal identifier 114 assigned to the ID card using a keypad provided at the decoder 130. The decoder 130 may query a mapping table 118-c (or one of the mapping tables 118-a and 118-b) based on the combination of the read code pattern 112 and PIN, and obtain user information including the user's name, picture and date of birth. The obtained user information may be used to verify the identity and legal age of the user.

In a second example use case, a random code pattern 112 generated by the encoder 110 may be stored in a smart watch of a user. The user may use the smart watch to pay for groceries bought at a grocery store. For example, an authorized decoder 130 provided at the grocery store checkout counter may wirelessly receive the code pattern 112 from the smart watch. Additionally, the decoder may wirelessly receive a PIN as a personal identifier 114 from the smart watch. Optionally, the user may manually provide the PIN by typing the PIN on a keypad. Decoder 130 may query a mapping table 118-c (or one of the mapping tables 118-a and 118-b) based on the combination of the read code pattern 112 and PIN and obtain user information including the user's credit card number, expiration date and security code. The obtained user information may be used to process a payment for the purchases made by the user.

In a third example use case, a random code pattern 112 generated by encoder 110 may be assigned to a toll tag device and stored in a memory of the toll tag device. The toll tag device may be affixed to the windshield of a car owned by the user and may be capable of wirelessly transmitting the code pattern 112. When the car passes through a toll plaza, a decoder 130 provided at the toll plaza may wirelessly receive the code pattern 112 from the toll tag device. The decoder 130 may additionally read a VIN number of the car imprinted on the surface of the car. In this case the VIN number of the car is the personal identifier 114 assigned to the code pattern 112. Decoder 130 may query a mapping table 118-c (or one of the mapping tables 118-a and 118-b) based on the combination of the read code pattern 112 and VIN of the car and obtain user information including vehicle make, model, color and toll tag account details. The obtained user information may be used to verify that the vehicle has a valid toll tag account and to further process any toll payments.

Figure 2:
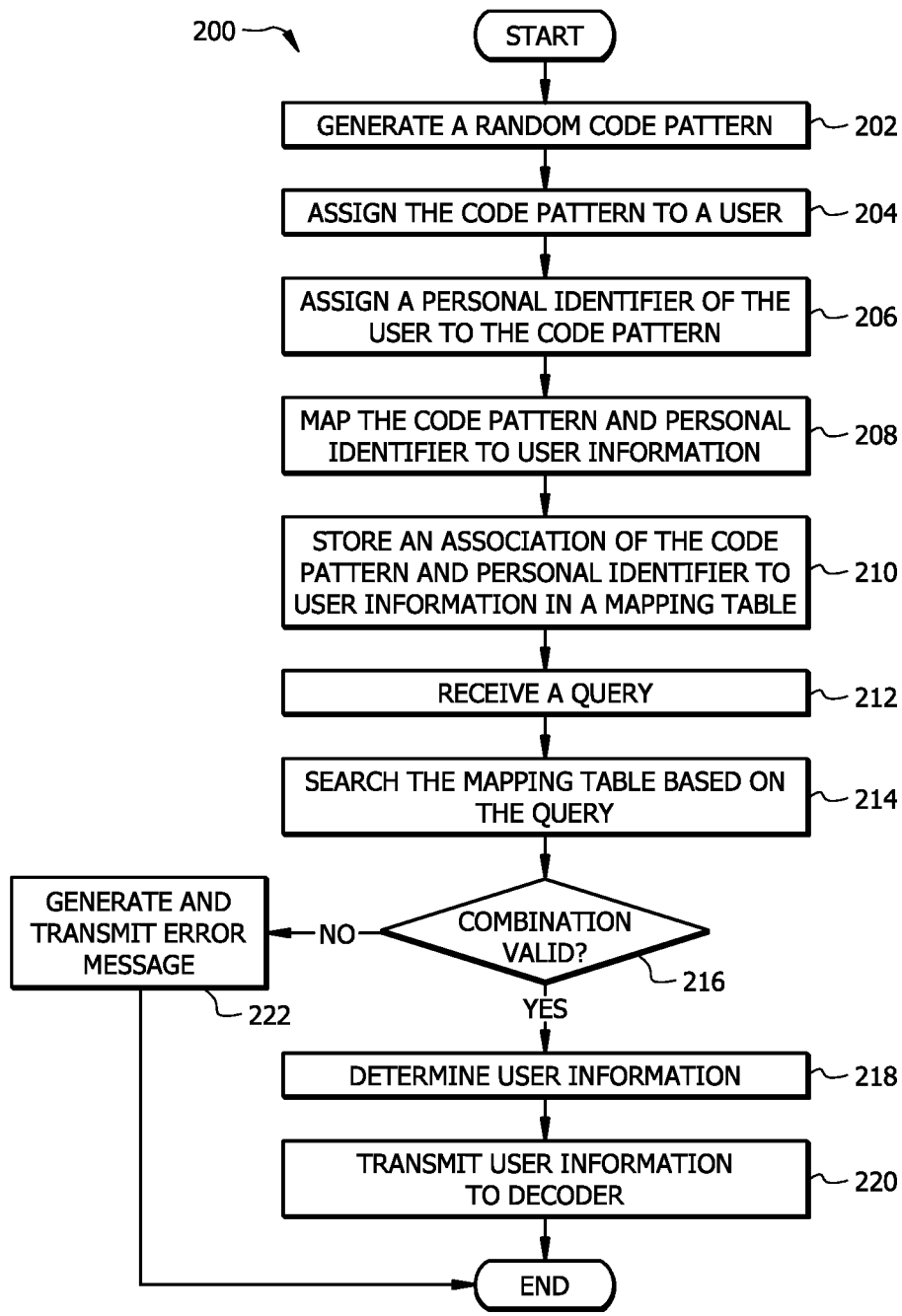
FIG. 2 is a flowchart of an example method for encoding user information, in accordance with certain embodiments of the present disclosure.

FIG. 2 is a flowchart of an example method 200 for encoding user information, in accordance with certain embodiments of the present disclosure. Method 200 may be performed by encoder 110 as shown in FIG. 1 and described above.

At step 202, encoder 110 generates a random code pattern 112. Encoder 110 may be configured to generate a plurality of random code patterns 112. Each random code pattern 112 generated by encoder 110 is completely random such that the random code pattern 112 itself does not include any information. A random code pattern 112 generated by encoder 110 may include, but is not limited to, one or more of numbers, letters, alphanumeric characters, a Quick Response (QR) code pattern, a bar code pattern, pictures, shapes, images, special characters and combinations thereof. Encoder 110 is provided with patterning elements 120 including, but not limited to, one or more of numbers, letters, words, shapes, images, pictures, special characters, bar code patterns, QR code patterns and combinations thereof. To generate a random code pattern 112, encoder 110 randomly combines two or more patterning elements 120.

At step 204, encoder 110 assigns the random code pattern 112 to a user. Assigning the random code pattern 112 to the user may include assigning the random code pattern 112 to a device owned by the user. The term "device" may refer to an electronic device such as electronic wearable device (e.g. smart watch), smart phone, electronic toll tag device etc., as well as a non-electronic device such as an identity (ID) card, driving license, credit card, debit card or the like. The random code pattern 112 assigned to the user device may be unique among code patterns 112 assigned across multiple devices owned by the user and/or among all code patterns generated by the encoder 110. In an alternative embodiment, the same random code pattern 112 may be assigned to two or more devices owned by the same user or owned by different users.

At step 206, encoder 110 assigns a personal identifier 114 of the user to the random code pattern 112. The personal identifier 114 of the user can include, but is not limited to, one or more of numbers, alphabets, alphanumeric characters, special characters and combinations thereof. For example, a personal identifier 114 of the user may be a personal identifier number (PIN) including a string of numbers. In some embodiments, a personal identifier 114 may include biometrics data of the user including, but not limited to, fingerprints, retina scans, facial recognition or combinations thereof. The personal identifier 114 can be assigned to the user or can be selected by the user. In one embodiment, the personal identifier 114 of the user may be associated with a device owned by the user. For example, the personal identifier 114 can be associated with a non-electronic device such as an identity card, a driving license or an electronic device such as an electronic wearable device owned by the user.

At step 208, encoder 110 maps a combination of the random code pattern 112 (assigned to the user) and the personal identifier 114 (assigned to the random code pattern) to user information 116 associated with the user. Thus, a unique combination of the random code pattern 112 and personal identifier 114 of the user identifies the user information 116 associated with the user.

In one or more embodiments, if the user owns multiple devices (e.g., multiple ID cards, driving license, credit cards, debit cards, smart watch etc.), encoder 110 may assign a different unique personal identifier 114 (e.g., PIN) to each user device. In such a case, each of the multiple personal identifiers 114 assigned to the user may be mapped to the same random code pattern 112 generated by encoder 110. In this case, the single random code pattern 112 (common to all the personal identifiers 114 and corresponding user devices) represents the total user information 116 associated with the user, and each personal identifier 114 assigned to the single code pattern 112 represents a portion of the user information 116 relevant to the user device to which the personal identifier 114 is assigned. For example, the total user information 116 associated with the user may include, user name, age, sex, residential address, height, ID number, driving license number, credit card number and corresponding expiration dates and security code, debit card number and corresponding expiration date and debit card PIN, and the like. However, a PIN assigned to the user's driving license is only associated with the user's name, age, sex, residential address, height, and driving license number and no other user information 116. On the other hand, a PIN assigned to the user's credit card is associated with the user's name, credit card number, expiration date and security code and no other user information 116.

In alternative embodiments, each device owned by the user may be assigned a different random code pattern 112, wherein each of the different random code patterns 112 assigned to the user (e.g., a user device) is associated with a portion of the user information 116 relevant to the respective device. In this case, the same personal identifier 114, or a different unique personal identifier 114, may be assigned to each user device and the unique random code pattern 112 of the device.

At step 210, encoder 110 stores an association of the random code pattern 112 and the personal identifier 114 to the user information 116 (or a portion thereof) in a mapping table (e.g., mapping table 118-a).

Each combination of a random code pattern 112 and personal identifier 114 stored in the mapping table 118-a is unique and is associated with corresponding user information 116 of a user. Mapping table 118-a may include a record for each device owned by the user, wherein a record of the mapping table 118-a represents an association of a unique combination of random code pattern 112 and personal identifier 114 to user information 116 (or a portion thereof). For example, the mapping table 118-a may include one record each for a driver license, a credit card, a debit card and a smart watch of a user, wherein each record includes a unique combination of a random code pattern 112 and a personal identifier 114 (e.g., PIN) mapped to user information 116 or a portion thereof relevant to the particular device of the user. As discussed above, a user may be assigned a single random code pattern 112 that is common across multiple user devices owned by the user and may be further assigned personal identifiers (e.g., PIN) which are unique to each user device. In this case, each user device record in the mapping table 118-a includes a combination of the same code pattern 112 and the unique device PIN mapped to the relevant user information 116 for the device. Alternatively, several user devices may be assigned different unique code patterns 112 and may be further assigned the same or different personal identifiers (e.g., PINs). In this case, each user device record in the mapping table 118-a includes a combination of the unique code pattern 112 and the device PIN mapped to the relevant user information 116 for the device.

In one or more embodiments, encoder 110 may print code patterns 112 on device surfaces such as surfaces of an ID card, driver's license, credit card, debit card, wearable device, smart phone or the like. A code printing device may be part of the encoder 110 or may be communicably connected to the encoder 110. For example, encoder 110 may use a laser printer to laser etch the code patterns 112 on a surface of a respective assigned device. The printed code pattern 112 may be read off the surface of the respective device by decoder 130. The decoder 130 may decode the read code pattern 112 to access the user information 116 associated with the code pattern 112.

In additional or alternative embodiments, encoder 110 may transmit the code pattern 112 to an electronic device owned by user using an electronic communication interface provided at the encoder 110. The communication interface may transmit the code pattern 112 to the electronic device over a wired connection or a wireless connection. Each electronic device may receive a respective code pattern 112 from the encoder and store the code pattern 112 in a local memory of the electronic device. A decoder 130 may read the code pattern 112 from the electronic device by receiving an electrical signal including the code pattern 122 from the electronic device. For example, a smart watch of a user may receive a respective code pattern 112 from the encoder 110 and store the code pattern 112 in a memory of the smart watch. The smart watch may transmit the code pattern 112 to a decoder 130 which can attempt to decode the code pattern 112 in order to access user information 116.

At step 212, encoder 110 receives a query 132, for example, from a decoder 130. The query 132 received from the decoder 130 may include the random code pattern 112 and the personal identifier 114 obtained by the decoder 130 from a device.

At step 214, encoder 110 may search the mapping table 118-a based on the query 132 received from the decoder 130. For example, upon receiving the query 132 from the decoder 130, encoder 110 may search the mapping table 118-a for user information 116 based on the combination of the random code pattern 112 and personal identifier included in the query 132. For example, encoder 110 may search the mapping table 118-a for user information 116 mapped to the combination of the random code pattern 112 and the personal identifier 114 received in the query 132.

At step 216, encoder 110 checks whether the combination of the random code pattern 112 and the personal identifier 114 received in the query is valid. For example, encoder 110 determines that the combination of the random code pattern 112 and the personal identifier 114 received in the query is valid, if the encoder 110 finds a record in the mapping table 118-a corresponding to the combination of the random code pattern 112 and the personal identifier 114 received in the query. On the other hand, encoder 110 determines that the combination of the random code pattern 112 and the personal identifier 114 received in the query is invalid, if a record does not exist corresponding to the combination of the random code pattern 112 and the personal identifier 114 received in the query 132.

If encoder 110 determines that the combination of the random code pattern 112 and the personal identifier 114 received in the query 132 is invalid, method 200 proceeds to step 222 where encoder 110 generates an error message. Encoder 110 may transmit the error message to the decoder 130.

However, if encoder 110 determines that the combination of the random code pattern 112 and the personal identifier 114 received in the query 132 is valid, method 200 proceeds to step 218 where encoder 110 determines from the mapping table 118-a user information 116 that is mapped to the combination of the random code pattern 112 and the personal identifier 114 received in the query 132.

At step 220, encoder 110 transmits the user information 116 found as a result of searching the mapping table 118-a, back to the decoder 130 (e.g., over network 170) in response to receiving the query 132.

Figure 3:
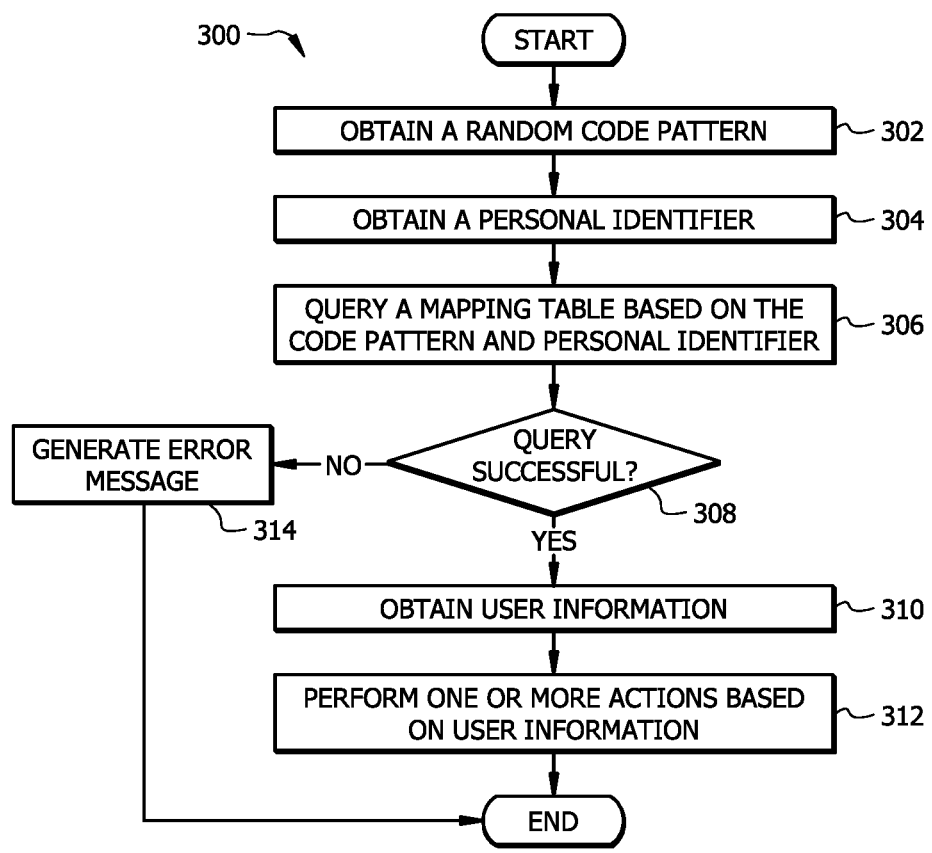
FIG. 3 is a flowchart of an example method for decoding user information, in accordance with certain embodiments of the present disclosure.

FIG. 3 is a flowchart of an example method 300 for decoding user information, in accordance with certain embodiments of the present disclosure. Method 300 may be performed by decoder 130 as shown in FIG. 1 and described above.

At step 302, decoder 130 obtains a random code pattern from a user device (e.g., ID card, credit card, smart watch etc.). Decoder 130 may be capable of and configured to read and/or receive the random code pattern 112 from the user device. In some cases, decoder 130 may read the code pattern 112 printed on a surface of the user device using one or more methods including, but not limited to, one or more of a camera, an infrared scanner, a barcode scanner, a Quick Response (QR) code scanner and a combination thereof. Additionally or alternatively, the user device may be an electronic device and the decoder 130 may receive the code pattern 112 locally stored by the electronic device using an electronic communication interface provided at the decoder 130. The communication interface of the decoder 130 may receive the code pattern 112 transmitted by the electronic device using a wired or wireless connection with the electronic device.

At step 304, decoder 130 obtains a personal identifier 114 of the user. As described above, the code pattern 112 does not include any useful information and a corresponding personal identifier 114 is needed to access user information 116 associated with the code pattern 112. Decoder 130 may obtain the personal identifier assigned to the user (or to the user's device) by several methods. In one embodiment, decoder 130 may be provided with a keypad which can be used by a user to type a personal identifier 114 (e.g., PIN). Additionally or alternatively, decoder 130 may electronically receive the personal identifier 114 transmitted from an electronic device using an electronic communication interface of the decoder 130. In some cases, decoder 130 may read the personal identifier 114 written or printed on a surface using a camera.

At step 306, decoder 130 queries a mapping table (e.g., one of the mapping tables 118-a, 118-b or 118-c) based on a combination of the obtained random code pattern 112 and the personal identifier 114.

Once the decoder 130 obtains the random code pattern 112 and the personal identifier 114, decoder 130 may generate a query 132 that includes the obtained random code pattern 112 and the personal identifier 114. Decoder 130 may query the mapping table (e.g., one of the mapping tables 118-a, 118-b or 118-c) based on the generated query 132. For example, decoder 130 may transmit the query 132 to the encoder 110, for example, over the network 170. Upon receiving the query 132 from decoder 130, encoder 110 may be configured to search the mapping table 118-a for user information based on a unique combination of the random code pattern 112 and personal identifier 114 included in the query 132. For example, encoder 110 may search the mapping table 118-a for user information 116 mapped to the combination of the random code pattern 112 and the personal identifier 114 received in the query 132. Encoder 110 may be configured to transmit the user information 116 found as a result of searching the mapping table 118-a, back to the decoder 130 (e.g., over network 170) in response to receiving the query 132.

Additionally or alternatively, decoder 130 may transmit the query 132 to the central repository 140, for example, over the network 170. Upon receiving the query 132 from decoder 130, central repository 140 may be configured to search the mapping table 118-b for user information 116 based on a unique combination of the random code pattern 112 and personal identifier 114 included in the query 132. For example, central repository 140 may search the mapping table 118-b for user information 116 mapped to the combination of the random code pattern 112 and the personal identifier 114 received in the query 132. Central repository 140 may be configured to transmit the user information 116 found as a result of searching the mapping table 118-b, back to the decoder 130 (e.g., over network 170) in response to receiving the query 132.

Additionally or alternatively, decoder 130 may be configured to search mapping table 118-c locally stored at the decoder 130, based on the generated query 132. For example, decoder 130 may search the mapping table 118-c for user information 116 mapped to the combination of the random code pattern 112 and the personal identifier 114 included in the query 132. Decoder 130 may obtain user information 116 based on searching the mapping table 118-c.

At step 308, decoder 130 may check if querying the mapping table was successful. For example, the decoder 130 may determine that the querying was successful if decoder 130 receives user information 116 from one or both of the encoder 110 and the central repository 140, and/or obtains the user information 116 from the local querying of mapping table 118-c at the decoder 130. The decoder 130 determines the querying to be unsuccessful if unable to obtain the user information 116 in response to the querying the mapping table (e.g., one of the mapping tables 118-a, 118-b or 118-c). Additionally or alternatively, decoder 130 may determine the querying to be unsuccessful, if decoder 130 receives an error message from one or both of the encoder 110 and the central repository 140 in response to transmitting the query 132.

If the querying is not successful, method 300 proceeds to step 314 where decoder 130 generates an error message.

On the other hand, if the querying is successful, method 300 proceeds to step 310 where the decoder 130 obtains the user information 116 as described above from one or more of the encoder 110, central repository 140 and the decoder's querying of the local mapping table 118-c. For example, if the decoder 130 transmitted the query 132 to encoder 110, the decoder 130 receives the user information 116 from the encoder 110. If the decoder 130 transmitted the query 132 to the central repository 140, decoder 130 receives the user information 116 from the central repository. If the decoder 130 queried the mapping table 118-*c* locally stored at the decoder 130, the decoder obtains the user information 116 as a result of searching the mapping table 118-*c*.

At step 312, as described above, the decoder 130 performs one or more actions based on the obtained user information 116 depending on the use case.

Figure 4:
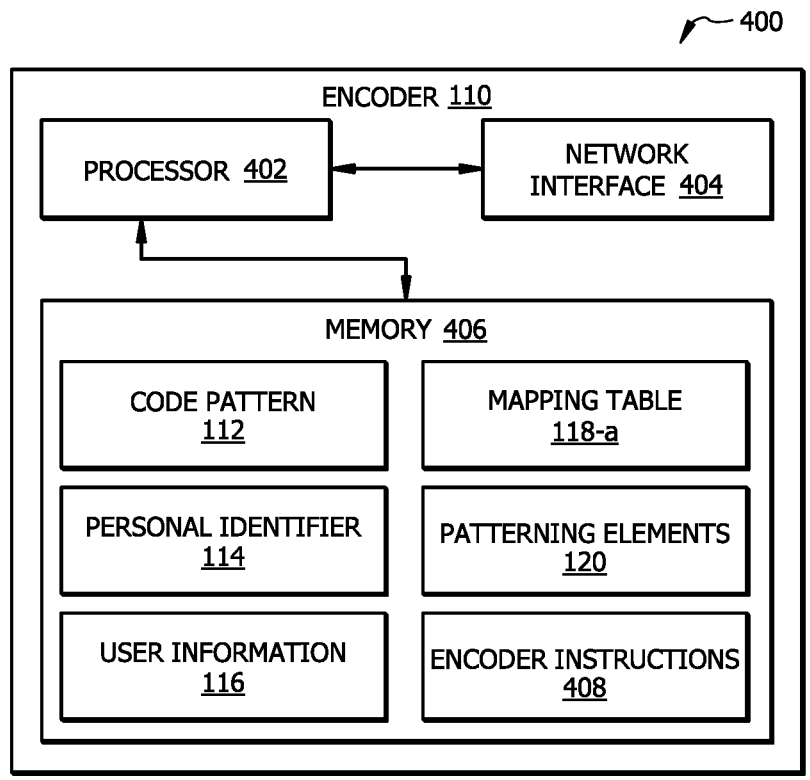
FIG. 4 illustrates an example schematic diagram of the encoder illustrated in FIG. 1, in accordance with one or more embodiments of the present disclosure.

FIG. 4 illustrates an example schematic diagram of the encoder 110 illustrated in FIG. 1, in accordance with one or more embodiments of the present disclosure.

Encoder 110 includes a processor 402, a memory 406, and a network interface 404. The encoder 110 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., encoder instructions 408) to implement the encoder 110. In this way, processor 402 may be a special-purpose computer designed to implement the functions disclosed herein. In one or more embodiments, the encoder 110 is implemented using logic units, FPGAs, ASICs, DSPs, or any other suitable hardware. The encoder 110 is configured to operate as described with reference to FIGS. 1-2. For example, the encoder may be configured to perform at least a portion of the method 200 as described in FIG. 2.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store code patterns 112, personal identifiers 114, user information 116, mapping table 118-*a*, patterning elements 120 and encoder instructions 408. The encoder instructions 408 may include any suitable set of instructions, logic, rules, or code operable to execute the encoder 110.

The network interface 404 is configured to enable wired and/or wireless communications. The network interface 404 is configured to communicate data between the encoder 110 and other devices, systems, or domains (e.g. decoder 130, central repository 140, printing devices, user electronic devices etc.). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

Figure 5:
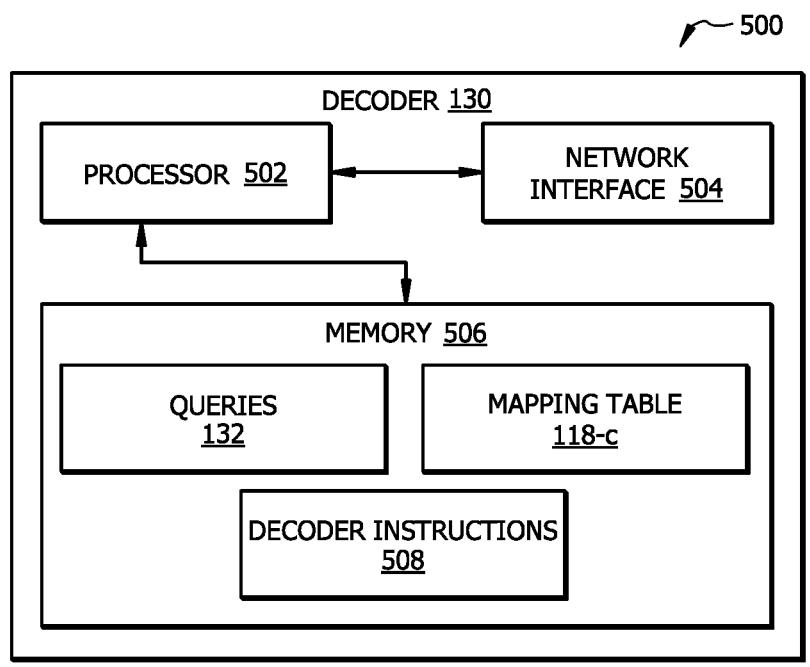
FIG. 5 illustrates an example schematic diagram of the decoder illustrated in FIG. 1, in accordance with one or more embodiments of the present disclosure.

FIG. 5 illustrates an example schematic diagram of the decoder 130 illustrated in FIG. 1, in accordance with one or more embodiments of the present disclosure.

Decoder 130 includes a processor 502, a memory 506, and a network interface 504. The decoder 130 may be configured as shown in FIG. 5 or in any other suitable configuration.

The processor 502 comprises one or more processors operably coupled to the memory 506. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., decoder instructions 508) to implement the decoder 130. In this way, processor 502 may be a special-purpose computer designed to implement the functions disclosed herein. In one or more embodiments, the decoder 130 is implemented using logic units, FPGAs, ASICs, DSPs, or any other suitable hardware. The decoder 130 is configured to operate as described with reference to FIGS. 1 and 3. For example, the decoder 130 may be configured to perform at least a portion of the method 300 as described in FIG. 3.

The memory 506 comprises one or more disks, tape drives, or solid-state drives, and may be used as an over-flow data storage device, to store programs when such programs are selected for execution, and to store instructions and data that are read during program execution. The memory 506 may be volatile or non-volatile and may comprise a read-only memory (ROM), random-access memory (RAM), ternary content-addressable memory (TCAM), dynamic random-access memory (DRAM), and static random-access memory (SRAM).

The memory 506 is operable to store queries 132 generated by the decoder 130, mapping table 118-*c*, and decoder instructions 508. The decoder instructions 508 may include any suitable set of instructions, logic, rules, or code operable to execute the decoder 130.

The network interface 504 is configured to enable wired and/or wireless communications. The network interface 504 is configured to communicate data between the decoder 130 and other devices, systems, or domains (e.g. encoder 110, central repository 140, code pattern reading devices, user electronic devices etc.). For example, the network interface 504 may comprise a Wi-Fi interface, a LAN interface, a WAN interface, a modem, a switch, or a router. The processor 502 is configured to send and receive data using the network interface 504. The network interface 504 may be configured to use any suitable type of communication protocol as would be appreciated by one of ordinary skill in the art.

It may be noted that the central repository 140 may be implemented similar to the encoder 110 and decoder 130 as shown in FIG. 1. For example, the central repository 140 may include a processor and a memory storing instructions to implement the respective functionality of the central repository 140 when executed by the processor. The memory of the central repository 140 may further store mapping table 118-*b*.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
at least one processor configured to:
generate a random code pattern;
assign the random code pattern to a user;
assign a personal identifier of the user to the random code pattern;
map a combination of the random code pattern and the personal identifier to user information associated with the user;
store an association of the random code pattern and the personal identifier to the user information in a mapping table;
receive from a decoder a query comprising the random code pattern and the personal identifier of the user, wherein the decoder is configured to decode the random code pattern;
determine based on the mapping table, the user information mapped to the combination of the random code pattern and the personal identifier;
transmit the user information to the decoder;
assign the random code pattern to a second user;
assign a second personal identifier of the second user to the random code pattern, wherein the second personal identifier of the second user is different from the personal identifier of the user;
map a combination of the random code pattern and the second personal identifier to second user information associated with the second user; and
store a second association of the random code pattern and the second personal identifier to the second user information in the mapping table;
wherein the combination of the random code pattern and the second personal identifier is used to access the second user information at the decoder; and
a memory coupled to the at least one processor and configured to store the mapping table.

2. The system of claim 1, wherein the at least one processor is further configured to:
obtain a plurality of patterning elements comprising one or more of numbers, letters, words, shapes, images, pictures, special characters, bar code patterns, Quick Response (QR) code patterns and combinations thereof; and
randomly combine two or more of the patterning elements to generate the random code pattern.

3. The system of claim 1, wherein the random code pattern comprises one or more of numbers, letters, alphanumeric characters, a QR code pattern, a bar code pattern, pictures, shapes, images, special characters or combinations thereof.

4. The system of claim 1, wherein the at least one processor is further configured to imprint the random code pattern on one or more of a credit card, a debit card, an identity card or a device owned by the user.

5. The system of claim 1, wherein the at least one processor is further configured to transmit the random code pattern to an electronic device associated with the user, wherein the random code pattern is stored in a memory of the electronic device.

6. The system of claim 1, wherein the personal identifier of the user comprises one or more of numbers, alphabets, alphanumeric characters or special characters.

7. The system of claim 1, wherein the at least one processor is further configured to:
assign the random code pattern to a second user;
assign a second personal identifier of the second user to the random code pattern, wherein the second personal identifier of the second user is different from the personal identifier of the user;
map a combination of the random code pattern and the second personal identifier to second user information associated with the second user; and
store a second association of the random code pattern and the second personal identifier to the second user information in the mapping table;
wherein the combination of the random code pattern and the second personal identifier is used to access the second user information at the decoder.

8. The system of claim 1, wherein the mapping table is stored in a central repository accessible by a plurality of decoders.

9. The system of claim 1, wherein the mapping table is transmitted to one or more decoders for storing in respective local memories of the decoders.

10. A method for encoding user information, comprising:
generating a random code pattern;
assigning the random code pattern to a user;

assigning a personal identifier of the user to the random code pattern;
mapping a combination of the random code pattern and the personal identifier to the user information associated with the user;
storing an association of the random code pattern and the personal identifier to the user information in a mapping table;
receiving from a decoder a query comprising the random code pattern and the personal identifier of the user, wherein the decoder is configured to decode the random code pattern;
determining, based on the mapping table, the user information mapped to the combination of the random code pattern and the personal identifier;
transmitting the user information to the decoder;
assigning the random code pattern to a second user;
assigning a second personal identifier of the second user to the random code pattern, wherein the second personal identifier of the second user is different from the personal identifier of the user;
mapping a combination of the random code pattern and the second personal identifier to second user information associated with the second user; and
storing a second association of the random code pattern and the second personal identifier to the second user information in the mapping table;
wherein the combination of the random code pattern and the second personal identifier is used to access the second user information at the decoder.

11. The method of claim 10, wherein generating the random code pattern comprises:
obtaining a plurality of patterning elements comprising one or more of numbers, letters, words, shapes, images, pictures, special characters, bar code patterns, Quick Response (QR) code patterns or combinations thereof; and
randomly combining two or more of the patterning elements to generate the random code pattern.

12. The method of claim 10, wherein the random code pattern comprises one or more of numbers, letters, alphanumeric characters, a QR code pattern, a bar code pattern, pictures, shapes, images, special characters or combinations thereof.

13. The method of claim 10, further comprising imprinting the random code pattern on one or more of a credit card, a debit card, an identity card or a device associated with the user.

14. The method of claim 10, further comprising transmitting the random code pattern to an electronic device associated with the user, wherein the random code pattern is stored in a memory of the electronic device.

15. The method of claim 10, further comprising:
assigning the random code pattern to a second user;
assigning a second personal identifier of the second user to the random code pattern, wherein the second personal identifier of the second user is different from the personal identifier of the user;
mapping a combination of the random code pattern and the second personal identifier to second user information associated with the second user; and
storing a second association of the random code pattern and the second personal identifier to the second user information in the mapping table;
wherein the combination of the random code pattern and the second personal identifier is used to access the second user information at the decoder.

16. The method of claim 10, wherein the mapping table is stored in a central repository accessible by a plurality of decoders.

17. A non-transitory computer-readable medium storing instructions which when executed by at least one processor cause the at least one processor to:
generate a random code pattern;
assign the random code pattern to a un-ser;
assign a personal identifier of the user to the random code pattern;
map a combination of the random code pattern and the personal identifier to the user information associated with the user;
store an association of the random code pattern and the personal identifier to the user information in a mapping table;
receive from a decoder a query comprising the random code pattern and the personal identifier of the user, wherein the decoder is configured to decode the random code pattern;
determine, based on the mapping table, the user information mapped to the combination of the random code pattern and the personal identifier; and
transmit the user information to the decoder;
assign the random code pattern to a second user;
assign a second personal identifier of the second user to the random code pattern, wherein the second personal identifier of the second user is different from the personal identifier of the user;
map a combination of the random code pattern and the second personal identifier to second user information associated with the second user; and
store a second association of the random code pattern and the second personal identifier to the second user information in the mapping table;
wherein the combination of the random code pattern and the second personal identifier is used to access the second user information at the decoder.

18. The non-transitory computer-readable medium of claim 17, wherein generating the random code pattern comprises:
obtaining a plurality of pattering elements comprising one or more of numbers, letters, words, shapes, images, pictures, special characters, bar code patterns, Quick Response (QR) code patterns or combinations thereof; and
randomly combining two or more of the patterning elements to generate the random code pattern.

19. The non-transitory computer-readable medium of claim 17, wherein the random code pattern comprises one or more of numbers, letters, alphanumeric characters, a QR code pattern, a bar code pattern, pictures, shapes, images, special characters or combinations thereof.

* * * * *